May 4, 1926.
L. A. DOUGHTY
STORAGE BATTERY BOX
Filed Nov. 25, 1924
1,583,247
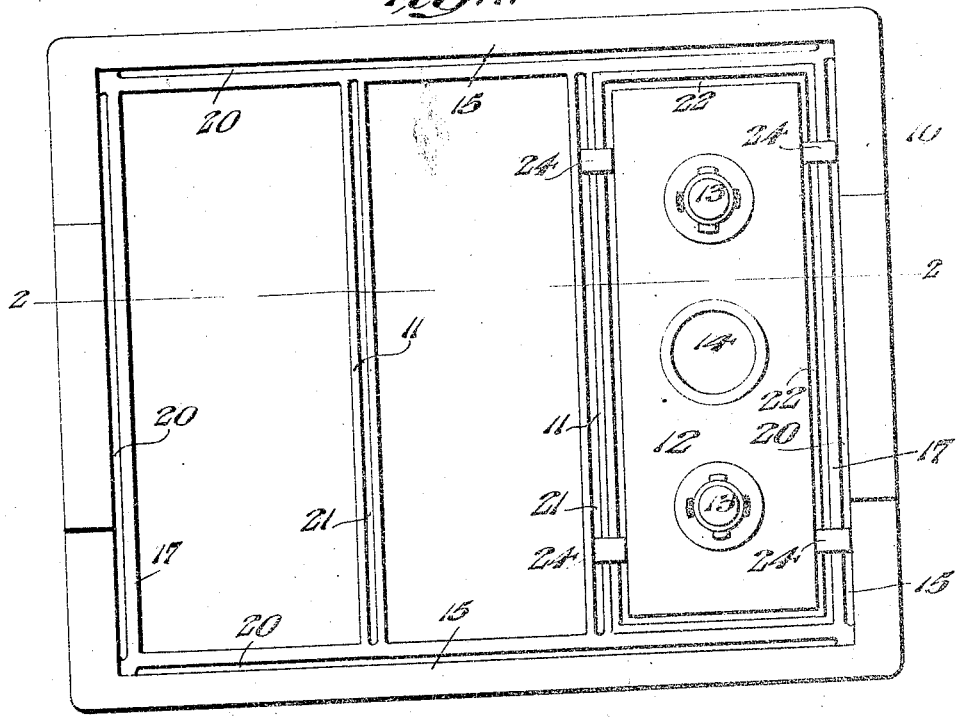
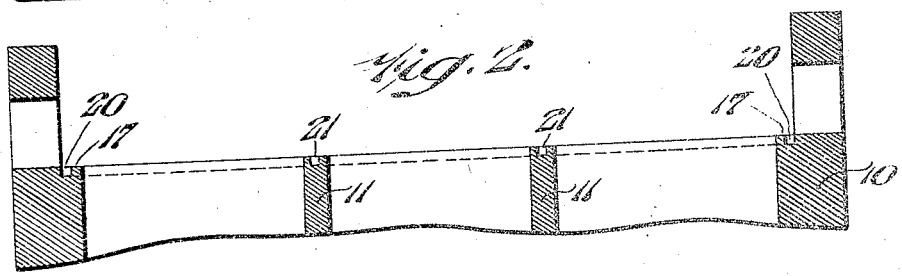
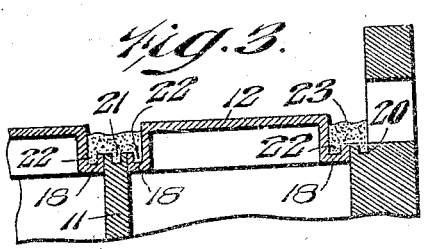 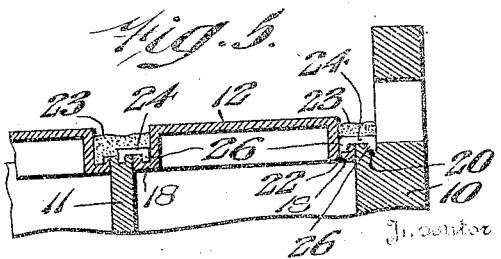
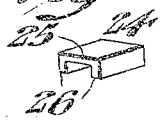
Leon A. Doughty.

Patented May 4, 1926.

1,583,247

UNITED STATES PATENT OFFICE.

LEON A. DOUGHTY, OF GLENSIDE, PENNSYLVANIA.

STORAGE-BATTERY BOX.

Application filed November 25, 1924. Serial No. 752,197.

*To all whom it may concern:*

Be it known that I, LEON A. DOUGHTY, a citizen of the United States, and a resident of Glenside, county of Montgomery, State of Pennsylvania, have invented certain new and useful Improvements in Storage-Battery Boxes, of which the following is a specification.

The present invention relates to storage batteries, and more particularly to the box or container construction of such batteries.

Some of the objects of the present invention are to provide an improved box for storage batteries; to provide means for preventing storage battery boxes from leaking; to provide an improved means for sealing the joints between the sides of a storage battery box and the cover or covers therefor; to provide means whereby the battery acid cannot leak or seep out by way of a joint, between a side and cover, which has opened up; to provide means to increase the length of travel of acid or fluid by way of the joint between the battery box and the seal in case of a leak at such joint; to provide means for preventing expansion or spreading apart of battery covers, side walls, or partitions; and to provide other improvements as will hereinafter appear.

In the accompanying drawings, Fig. 1 represents a plan of a storage battery box embodying one form of the present invention; Fig. 2 represents a section on line 2—2 of Fig. 1, with the lower half of the box omitted; Fig. 3 represents a sectional detail of the cover construction with the sealing compound in place; Fig. 4 represents a perspective of one of the bridge members; and Fig. 5 represents a sectional detail of the sealing construction taken through one of the bridge members.

Referring to the drawings, a storage battery box 10 is shown of the generally accepted rectangular form and which may be of wood, rubber, or any other suitable material. As here shown the box 10 is divided by transverse partitions 11 into three cells, and cover plates 12 are provided respectively for the cells, as is the usual practice in such boxes. It will be understood that the cover plates 12 are provided with the usual circuit terminals 13 and filling or inspection openings 14.

In connection with the jointing and sealing of the cover plates with the side walls of the box, it has been customary to rabbet the inner top marginal edge of the box walls and also to provide a flange extending circumferentially about the outside of each cover plate so that when the parts are assembled the ledge formed by the rabbeting lies substantially in the plane of the bottom of the respective cover flanges and thus forms a supporting seat for said flanges. In carrying out the present invention, the inner marginal top edge of the walls 15 of the box 10 are rabbeted to form an inner circumferential ledge 17, and the cover plates 12 are provided respectively with exterior continuous flanges 18 which in assembled condition lie flush, or nearly so, with the aforesaid ledge 17.

For the purpose of more completely bonding the walls 15 and plates 12 together to prevent opening up of the joint between them, the ledge 17 is provided with grooves 20 extending parallel to the sides of the respective cells, and like grooves 21 are provided in the tops of the respective cells, and like grooves 21 are provided in the tops of the respective partitions 11. This construction provides a substantially continuous groove encircling each cell. In a similar manner each cover plate flange 18 is provided with a groove 22 in its upper surface, which follows the contour of the cover plate and thus substantially parallels the groove formed in the walls and partitions.

With the parts in assembled condition as shown in Fig. 3, a sealing compound 23 is poured into the space between the box walls 15 and the cover plates 12, and when set forms a complete seal for the contents of the cells. Furthermore, the setting of the compound in the grooves 20 and 21 acts as a clamp to unite the adjacent wall and cover and resists expansion or forces tending to cause the box wall to break away from the sealing compound.

As a means for reinforcing the joint between box walls, partitions and cover plates, and also anchoring the parts to resist parting action, a plurality of bridge members 24 are provided, each consisting of a relatively flat body 25 having a width substantially equal to the distance between the grooves 20 and 22, and 21 and 22, and provided with flanges 26 arranged to seat in said grooves respectively. Thus, in operative position the bridge members 24 are located at suitable intervals along the grooves, with their flanges 26 seated in the adjacent grooves, while the body portion 25 bridges the box and cover portion between the grooves. When such bridge members 24 are used between a side wall of the box and a cover plate, the width of the body 25 and the distance between the flanges 26 is made to correspond to the distance between the grooves 20 and 22. When these bridge members 24 are placed, the sealing compound is run into the spaces surrounding the cover plates, and thus fills the grooves 20, 21 and 22, and encases the members 24 in their anchoring positions. The result is a complete unitary bonding of the side walls, partitions and cover plates, with the added strength derived from the groove filled ledges and flanges.

In battery boxes as heretofore constructed, having a plain ledge bounding the inner top circumference of the box and surrounding the cover plates, it has been a common source of trouble to have the sealing compound open up along the face of the box wall, due to the fact that the latter either expands away from the compound or works loose through pressure on the sides of the box, and in consequence the acid seeps upwardly and out through the seam so formed. By the present invention such opening up of the joint between the compound and the walls of the box is not only unlikely to happen because of the sealed joint between the flush ledge and flange but also because of the interlocking effect of the grooves and sealing compound, and even though there should be a spreading of the joint, it is practically impossible for the acid to find its way to the outside of the casing. It will thus be apparent that a complete unitary jointing of a storage box side wall cover and sealing compound has been provided wherein all the parts are anchored and bonded together in a leak-proof manner, and also in such a manner that stresses tending to separate the parts are effectively resisted.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A storage battery box comprising straight-sided walls having an inner continuous peripheral ledge, a cover having a flange arranged to project toward and to said ledge, and means for interlocking said ledge and said flange and sealing the joint therebetween.

2. A storage battery box comprising straight-sided walls having an inner peripheral ledge, a cover having a flange arranged to project toward and to said ledge, and means including a groove in said ledge for interlocking said ledge and said flange and sealing the joint therebetween.

3. A storage battery box comprising straight-sided walls having an inner peripheral ledge, a cover having a flange arranged to project toward and to said ledge, and means including a groove in said flange for interlocking said ledge and said flange and sealing the joint therebetween.

4. A storage battery box comprising straight-sided walls having an inner peripheral ledge, a cover having a flange arranged to project toward and to said ledge, and means including grooves respectively in said ledge and flange for interlocking said ledge and said flange and sealing the joint therebetween.

5. A storage battery box comprising straight-sided walls having a ledge formed on the inner face thereof, a partition between said walls forming two cell compartments, the upper face of said partition being flush with said ledge and covers respectively for said cell compartments, each cover having a flange arranged in abutting relation with respect to said ledge and said partition, grooves formed respectively in said ledge and said partition, a groove in said flange, and a sealing compound co-acting with said groove to interlock said cover partition and walls together to form a leak-proof joint.

6. A storage battery box comprising side walls having an inner peripheral ledge, a cover having a flange arranged to project toward said ledge, means including a sealing compound for interlocking said ledge and said flange and sealing the joint therebetween, and an anchoring means embedded in said sealing compound and connecting said ledge and flange.

7. A storage battery box comprising side walls having an inner peripheral ledge, a cover having a flange arranged to project toward said ledge, means including grooves respectively in said ledge and flange for interlocking said ledge and said flange and sealing the joint therebetween, and a bridge member having parts seated in said grooves for inter-connecting said ledge and flange.

8. A storage battery box comprising straight-sided walls having an inner peripheral ledge, said ledge having a locking groove in its upper face.

9. A storage battery box comprising straight-sided walls having an inner peripheral sealing compound receiving ledge, and a cross partition in the box dividing it into a plurality of receptacles, the upper face of the partition being flush with the upper face of the ledge, said ledge and partition having locking grooves in their upper faces.

10. A storage battery box comprising straight-sided walls having an inner continuous peripheral ledge, a cover arranged in operative position to be encircled by said ledge and having its marginal portion in abutting relation with respect to said ledge, and a sealing compound molded on said ledge and over the joint between said marginal portion and said ledge.

11. A storage battery box comprising straight-sided walls having an inner continuous peripheral ledge, a cover arranged in operative position to be encircled by said ledge and having its marginal portion in abutting relation with respect to said ledge, a sealing compound molded on said ledge and over the joint between said marginal portion and said ledge, and means to interlock said ledge and compound.

Signed at Philadelphia, county of Philadelphia, State of Pennsylvania, this eighteenth day of November, 1924.

LEON A. DOUGHTY.